United States Patent

[11] 3,563,610

[72] Inventors  A. J. Speegle;
                John F. Mason, Duncan, Okla.
[21] Appl. No.  791,435
[22] Filed      Jan. 15, 1969
[45] Patented   Feb. 16, 1971
[73] Assignee   Halliburton Company
                Duncan, Okla.

[54] APPARATUS FOR MIXING AND UNLOADING PULVERULENT MATERIAL
8 Claims, 11 Drawing Figs.
[52] U.S. Cl. .................................................... 302/29, 302/52
[51] Int. Cl. ........................................................ B65g 53/04
[50] Field of Search ........................................... 302/29, 31, 52, 53, 17

[56] References Cited
UNITED STATES PATENTS
2,565,835  8/1951  Adams ........................ 302/53
2,815,987  12/1957 Sylvest ........................ 302/29

Primary Examiner—Andres H. Nielsen
Attorney—Dunlap, Laney, Hessin & Dougherty

ABSTRACT: Apparatus for mixing and unloading pulverulent material stored in a silo comprising a plurality of aeration troughs positioned end to end in the floor of said silo forming at least one row therein. Said aeration troughs include self-contained air tight compartments for conducting air from one aeration trough to another thereby eliminating the necessity of separate air piping. The aeration troughs and air conducting compartments contained therein are connected together by means of resilient tubular connectors slidably secured in openings in the ends of said troughs.

PATENTED FEB 16 1971

INVENTORS
A. J. SPEEGLE &
JOHN F. MASON
BY

ATTORNEYS

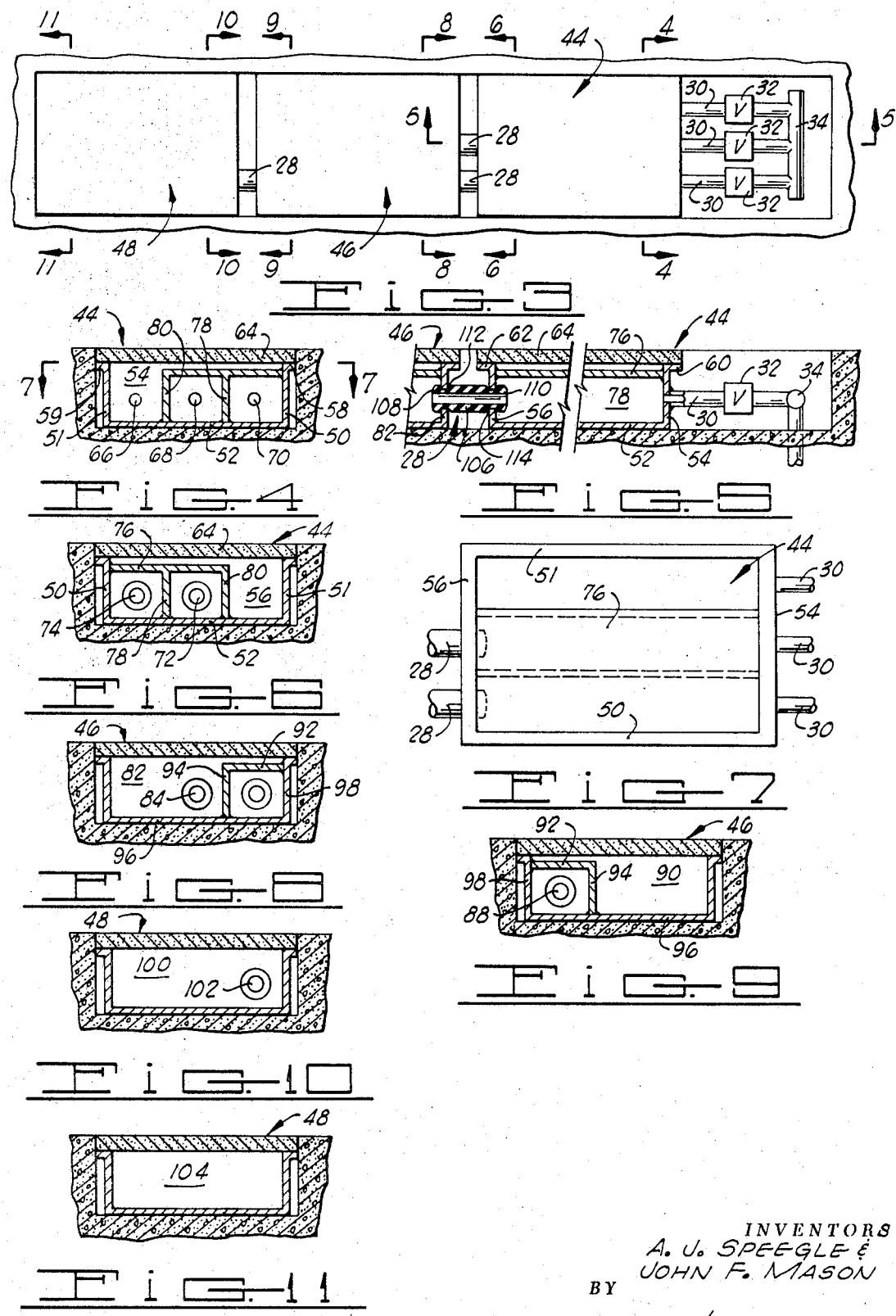

APPARATUS FOR MIXING AND UNLOADING PULVERULENT MATERIAL

BACKGROUND OF THE INVENTION

1. Field of the Invention

The present invention relates generally to apparatus for mixing and unloading pulverulent material, and more particularly, but not by way of limitation, to improved apparatus for mixing and unloading pulverulent material stored in a silo comprising a plurality of aeration troughs positioned end to end in the floor of the silo forming at least one row therein.

2. Description of the Prior Art

Many various types of apparatus have been developed for mixing and unloading pulverulent material from a silo. Commonly, such apparatus include one or more rows of aeration troughs disposed in the floor of the silo, each row including one or more separate aeration troughs having air permeable tops. Compressed air is distributed to each such aeration trough by separate conduits terminating within each aeration trough. Prior to the present invention, it has been necessary to provide relatively deep trenches in the floor of a silo to contain the air piping and aeration troughs mentioned above. Particularly where the floor of the silo is constructed of concrete, considerable labor and expense are required to form such trenches. Additionally, the installation of air piping in the trenches and connection of the air piping to each individual aeration trough is time consuming and expensive.

SUMMARY OF THE INVENTION

The present invention is directed to apparatus for mixing and unloading pulverulent material in a silo, said apparatus including at least one row of two or more aeration troughs positioned end to end in the floor of said silo, each of said aeration troughs having airtight opposite sides, an airtight bottom, an air permeable top, a forward end and a rearward end. Each of the aeration troughs has at least one opening in the rearward end thereof, and has a number of pairs of aligned openings in the forward and rearward ends, the number of pairs of aligned openings in a first of the aeration troughs in the row being equal to the total number of aeration troughs in the row minus one, the second aeration trough in the row and each successive aeration trough having one less pair of aligned openings in said forward and rearward ends thereof than the aeration trough just preceding it in the row. Separate airtight compartments connecting each pair of aligned openings in the forward and rearward ends of said aeration troughs are disposed within said aeration troughs, and means for connecting each of said openings in the rearward end of the second aeration trough in the row to the openings in the forward end of the first aeration trough in the row, and for connecting the openings in the rearward end of each successive aeration trough with the openings in the forward end of the aeration trough just preceding it in the row are provided. Also, means for connecting a source of compressed air to each of the openings in the rearward end of said first aeration trough are provided.

It is therefore an object of the present invention to provide improved apparatus for mixing and unloading pulverulent material stored in a silo.

It is a further object of the present invention to provide apparatus for mixing and unloading pulverulent material in a silo including aeration troughs having self-contained airtight compartments for conducting air to each aeration trough in a row.

It is still a further object of the present invention to provide apparatus for mixing and unloading pulverulent material in a silo including aeration troughs which may be quickly and inexpensively connected together by means of resilient tubular connectors.

Still a further object of the present invention is to provide apparatus for mixing and unloading pulverulent material in a silo comprising a plurality of aeration troughs which may be readily installed in relatively shallow trenches in the floor of said silo.

Other objects and advantages of the invention will be evident from the following detailed description when read in conjunction with the accompanying drawings which illustrate the invention.

BRIEF DESCRIPTION OF THE DRAWINGS

FIG. 3 is a top view of a row of the apparatus of the present invention.

FIG. 4 is an end sectional view of the apparatus of the present invention taken along line 4—4 of FIG. 3.

FIG. 5 is a side sectional view of the apparatus of the present invention taken along line 5—5 of FIG. 3.

FIG. 6. is an end sectional view of the apparatus of the present invention taken along line 6—6 of FIG. 3.

FIG. 7 is a top sectional view taken along lines 7—7 of FIG. 4.

FIG. 8 is an end sectional view taken along line 8—8 of FIG. 3.

FIG. 9 is an end sectional view taken along line 9—9 of FIG. 3

FIG. 10 is an end sectional view taken along line 10—10 of FIG. 3.

FIG. 11 is an end sectional view taken along line 11—11 of FIG. 3.

DESCRIPTION OF THE PREFERRED EMBODIMENT

Figure 2:
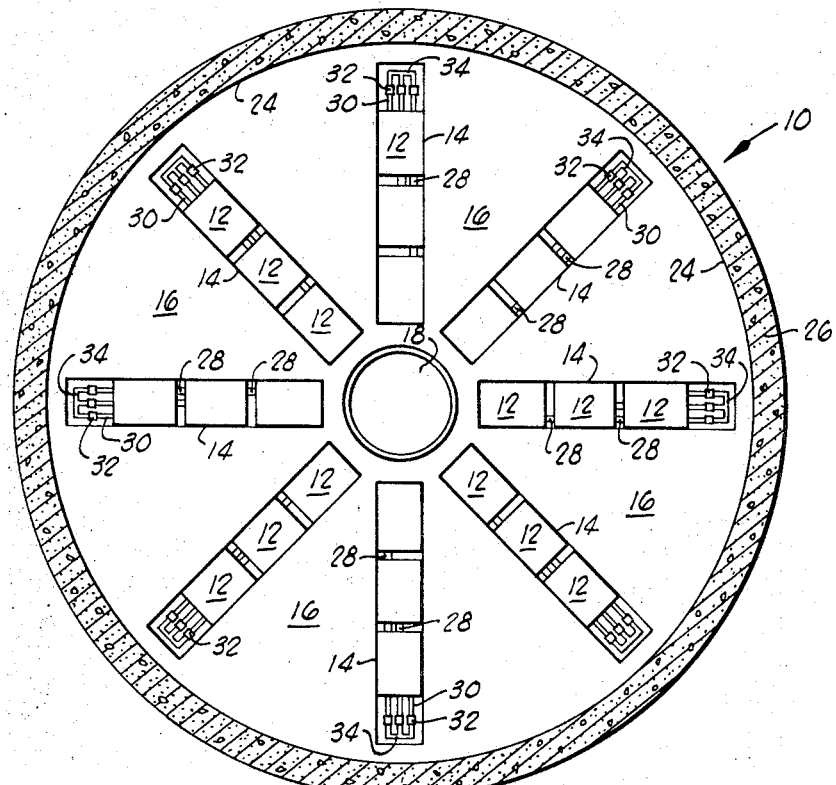
FIG. 2 is a horizontal sectional view of the silo taken along line 2—2 of FIG. 1.
Figure 1:
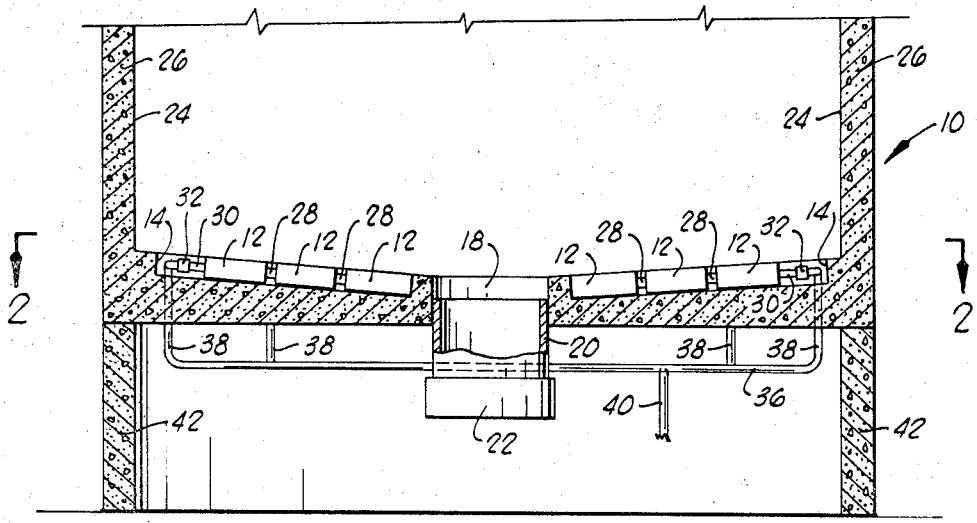
FIG. 1 is a vertical sectional view of the lower portion of a concrete silo including the apparatus of the present invention.

Referring now to FIGS. 1 and 2, a concrete silo, generally indicated by the numeral 10, is shown with the apparatus of the present invention installed in the floor thereof. The apparatus of the present invention basically comprises a plurality of aeration troughs 12 positioned end to end in one or more trenches 14 formed in the floor 16 of the silo 10. A discharge passageway 18 extends through the floor 16 of silo 10 at the center thereof, and the floor 16 of silo 10 slopes downwardly throughout its entire surface towards the passageway 18. Connected to the passageway 18 is a conduit 20 which has a shutoff valve 22 connected to its lower end. Shutoff valve 22 may be any conventional to its lower end. Shutoff valve 22 may be any conventional large diameter valve suitable for shutting off the gravitational flow of pulverulent material through conduit 20.

The trenches 14 may be formed in the floor 16 of silo 10 through the use of conventional forms when the floor is poured. The trenches are positioned so that they extend from a point adjacent to passageway 18 to a point near the periphery of the inside surface 24 of the wall 26 of silo 10.

The aeration troughs 12 are connected together in each trench 14 by resilient connectors 28 which will be further described hereinbelow. The aeration trough 12 in each trench 14 closest to the surface 24 of wall 26 is connected to distribution valves 32 by conduits 30. Distribution valves 32 are in turn connected to headers 34. Each of headers 34 are connected to master conduit 36 by lateral conduits 38. Master conduit 36 is connected to conduit 40 which is connected to a source of compressed air (not shown).

Silo 10 may be elevated on footings 42 in order to provide access to valve 22, and pulverulent material unloaded therefrom, by trucks or other means for conveying the pulverulent material away from the silo 10.

For purposes of this disclosure, one row of aeration troughs 12 positioned in a trench 14 in the floor 16 of silo 10 will be described. It will be understood, however, that each row of aeration troughs 12 in each trench 14 in silo 10 is indentical to the row to be described. Referring then to FIG. 3, a row of aeration troughs 12 is shown. As will be described further herein below, particular silos may contain rows of a varying number of aeration troughs. For purposes of this disclosure a row containing three of aeration troughs 12 will be described.

The first aeration trough 44 is positioned at the end of the row closest to wall 26 of silo 10. A second aeration trough 46 is positioned adjacent to aeration trough 44 and a third aeration trough 48 is positioned adjacent to aeration trough 46. As previously described, a source of compressed air is connected to header 34 by conduit 38. Header 34 is in turn connected to distribution valves 32 which are connected to aeration trough 44 by conduits 30. Distribution valves 32 may be any conventional type of valves which can be manually adjusted to bring about equal distribution of the compressed air through each of conduits 30 to aeration troughs 44, 46 and 48.

REferring now to FIGS. 4 and 5, aeration trough 44 basically comprises a pair of identical parallel airtight sides 50 and 51 of rectangular shape which are attached to an airtight bottom 52, also of rectangular shape. The sides 50 and 51 and bottom 52 are attached to a rearward end 54 of rectangular shape and forward end 56 identical to rearward end 54. The sides 50 and 51, bottom 52 and ends 54 and 56 are preferably formed of metal and are welded together so that an airtight rectangular enclosure is formed. The sides 50 and 51 include flanged portions 58 and 59 respectively at the upper ends thereof, and rearward end 54 and forward end 56 include flanged portions 60 and 62 respectively at the upper ends thereof. A porous air permeable member 64, which may be stone, densely woven fabric, such as multiply canvas of the general type used for building, or other suitable air permeable material is attached to flange portions 58 and 59 of sides 50 and 51, flanged portion 60 of rearward end 54 and flanged portion 62 of forward end 56 so that the top of the enclosure defined by sides 50 and 51, bottom 52, rearward end 54 and forward end 56 is completely covered by member 64. Gas permeable member 64 may be attached to flange portions 58 and 59 of sides 50 and 51, flange portion 60 of rearward end 54 and flange portion 62 of forward end 56 by means of bolts or other suitable attaching means (not shown).

As shown in FIG. 4, the rearward end 54 of aeration trough 44 includes openings 66, 68, and 70. Each of openings 66, 68 and 70 are of identical diameter, and are positioned equal distances one from another. Forward end 56 includes two openings 72 and 74 (FIG. 6), which are of identical diameter as openings 66, 68 and 70. Opening 72 in forward end 56 of aeration trough 44 is positioned in alignment both horizontally and vertically with opening 68 in rearward end 54 of aeration trough 44. In a like manner, opening 74 of forward end 56 of aeration trough 44 is aligned both horizontally and vertically with opening 70 in rearward end 54 of aeration trough 44.

Referring now to FIGS. 4 through 7, a baffle 76 is disposed within aeration trough 44 on a horizontal plane parallel with bottom 52 of aeration trough 44. Baffle 76 is welded to side 50, rearward end 54 and forward end 56 of aeration trough 44. It should be noted that baffle 74 is welded into aeration trough 44 at a position above openings 68 and 70 in rearward end 54 and openings 72 and 74 in forward end 56. A baffle 78 is positioned between aligned openings 70 and 74 and 68 and 72 in a vertical plane parallel with sides 50 and 51 of aeration trough 44. Baffle 78 is welded to bottom 52, baffle 76, rearward end 54 and forward end 56. Thus, an airtight compartment within aeration trough 44 is formed communicating opening 70 in rearward end 54 with opening 72 in forward end 56 of aeration trough 44. A second baffle 80 is disposed within aeration trough 44 in a vertical plane parallel with baffle 78. Baffle 80 is welded to bottom 52, rearward end 54, forward end 56, and baffle 76, thereby forming a second airtight compartment which provides communication between opening 68 in rearward end 54 and opening 72 in forward end 56 of aeration trough 44.

Aeration trough 46 is identical to aeration trough 44 except that it includes one less pair of aligned openings in its forward and rearward ends and one less compartment providing communication between said openings. Referring to FIGS. 8 and 9, aeration trough 46 includes a rearward end 82 having openings 84 and 86 disposed therein. Forward end 90 of aeration trough 46 includes an opening 88 aligned both horizontally and vertically with opening 86 in rearward end 82. A baffle 92 is disposed within aeration trough 46 on a horizontal plane parallel with the bottom 96, which is welded to side 98, rearward end 82 and forward end 90 of aeration trough 46. A second baffle 94 is disposed within aeration trough 46 on a vertical plane parallel with side 98 between openings 84 and 86 in rearward end 82. Baffle 94 is welded to the bottom 96, rearward end 82, and forward end 90 of trough 46, and is welded to baffle 92. Thus, an airtight compartment is formed within aeration trough 46 providing communication between opening 86 in rearward end 82 and opening 88 in forward end 90 of aeration trough 46. It should be noted that openings 84 and 86 in rearward end 82 of aeration trough 46 are positioned to align both horizontally and vertically with openings 72 and 74 in forward end 56 of aeration trough 44.

Aeration trough 48 is identical to aeration troughs 44 and 46 except that no aligned openings in its forward and rearward ends are provided and no airtight compartments are disposed therein. Referring to FIGS. 10 and 11, the rearward end 100 of aeration trough 48 includes an opening 102 and the forward end 104 of aeration trough 48 does not include any openings. Opening 102 in rearward end 100 of aeration trough 48 is positioned to provide alignment both vertically and horizontally with opening 88 in forward end 90 of aeration trough 46.

Referring again to FIGS. 3 through 6, the openings 66, 68 and 70 in rearward end 54 of aeration trough 44 are connected to conduits 30. Conduits 30 may be welded to rearward end 54 of aeration trough 44 positioned concentrically over openings 66, 68 and 70 thereby providing airtight connections between conduits 30 and rearward end 54 of aeration trough 44. Openings 72 and 74 in forward end 56 of aeration trough 44 are connected to openings 84 and 86 in rearward end 82 of aeration trough 46, and opening 88 in forward end 90 of aeration trough 46 is connected to opening 102 in rearward end 100 of aeration trough 48, by means of resilient connectors 28.

Referring particularly to FIG. 5, one of resilient connectors 28 is shown. Each of resilient connectors 28 basically comprises a tubular body member 106 having a forward portion 108 and a rearward portion 110. Forward portion 108 includes a groove 112 around its entire outer periphery on a plane perpendicular to the axis of tubular member 106. Rearward portion 110 includes a like groove 114 around its entire outer periphery on a plane perpendicular to the axis of tubular member 106. Forward portion 108 of tubular member 106 is slidably secured within opening 84 in rearward end 82 of aeration trough 46 with groove 112 engaging the entire inside periphery of opening 84. Rearward portion 110 is slidably secured within opening 72 of forward end 56 of aeration trough 44 with groove 114 engaging the entire periphery of opening 72. Due to the fact that tubular member 106 is formed of resilient material, forward portion 108 and rearward portion 110 may be readily inserted into openings 84 and 72. Thus, airtight connections are provided between the openings described above in the forward and rearward ends of aeration troughs 44, 46 and 48.

OPERATION AND CONSTRUCTION

As will be understood by those skilled in the art, the size and number of aeration troughs 12 utilized in a row, and the number of rows required in a particular silo depends on design factors such as the size and diameter of the silo, the density of the pulverulent material to be stored in the silo, etc. A basic design requirement is that sufficient aeration trough surface area and volume of compressed air are provided in the silo to bring about fluidization of the pulverulent material contained within the silo.

Referring to FIGS. 1 and 2, let it be assumed that silo 10 is filled with pulverulent material and it is desired to unload a portion of the pulverulent material from the silo. A truck or other conveying means is positioned under valve 22 which is opened. Compressed air is then introduced into conduit 40 from where it is conducted to distribution valves 32 as previously described. Distribution valves 32 serve to distribute the compressed air in equal volumes into each of conduits 30 and into each of the aeration troughs 12. Distribution valves 32 may be manually adjusted to bring about the desired air distribution prior to storing pulverulent material in silo 10. From conduits 30, an equal volume of air is conducted to each of aeration troughs 12 in each row by means of the airtight compartments disposed within the aeration troughs 12, and the resilient connectors 28 connecting the aeration troughs 12 in each row, described above. That is, one-third of the volume of air delivered to each row of aeration troughs is distributed to each aeration trough. From within each aeration trough the air passes upwardly trough the air permeable top of each aeration trough in sufficient volume and velocity to bring about the fluidization of the pulverulent material contained in silo 10. As is well known in the art, once the pulverulent material has been fluidized by the air, it takes on the characteristics of a fluid. Thus, due to the slope in floor 16 of silo 10 towards opening 18 and discharge valve 22, the fluidized pulverulent material will flow by gravity into opening 18, through conduit 20 and through discharge valve 22.

If it is desired to mix or homogenize pulverulent material contained in silo 10, without unloading the material, discharge valve 22 may be maintained in a closed position while air is passed into the silo 10 through aeration troughs 12. The pulverulent material contained within silo 10 will be fluidized and caused to move about within silo 10 thereby bringing about mixing of the pulverulent material within silo 10.

In construction of a silo including the apparatus of the present invention, relatively shallow trenches may be formed in the floor thereof by conventional means. A first aeration trough 12 may 12 may then be placed in each trench near the periphery of the walls of the silo and welded to conduits 30. Successive aeration troughs 12 may then be placed in each trench and simply and easily connected together by means of resilient connectors 28. Due to the fact that the air is conducted to each successive aeration trough through airtight compartments formed by baffles within the preceeding aeration trough, separate air piping is not required beneath the aeration troughs. Thus, considerably less time and labor are required for construction of trenches for the apparatus of the present invention compared to prior apparatus. Additionally, through the use of the resilient connectors 28 very little labor is required to complete an entire installation of the aeration troughs of the present invention bringing about a further savings of time and labor.

The present invention therefore is well adapted to carry out the objects and attain the ends and advantages mentioned as well as those inherent therein. While presently preferred embodiments of the invention are given for the purpose of disclosure, numerous changes and details of construction and arrangement of parts can be made which will readily suggest themselves to those skilled in the art and which are encompassed within the spirit of the invention disclosed herein.

We claim:

1. In apparatus for mixing and unloading pulverulent material stored in a silo, said apparatus including at least one row of two or more aeration troughs positioned end to end in the floor of said silo, each of said aeration troughs having airtight opposite sides, an airtight bottom, an air permeable top, a forward end and a rearward end, the improvement comprising:

each of said aeration troughs having at least one opening in said rearward end, and having a number of pairs of aligned openings in said forward and rearward ends, the number of said pairs of aligned openings in a first of said aeration troughs in said row being equal to the total number of aeration troughs in said row minus one, the second trough in said row and each successive trough having one less pair of aligned openings in said forward and rearward ends thereof than the trough just preceding it in said row;

separate airtight compartments providing communication between each pair of aligned openings in the forward and rearward ends of said aeration troughs disposed within said aeration troughs;

means for connecting each of said openings in the rearward end of said second aeration trough in said row to the openings in the forward end of said first aeration trough in said row, and for connecting the openings in the rearward end of each successive aeration trough with the openings in the forward end of the aeration trough just preceding it in said row; and means for connecting a source of compressed air to each of said openings in the rearward end of said first aeration trough.

2. The apparatus of claim 1 wherein said means for connecting each of said openings in the rearward end of said second aeration trough in said row to the openings in the forward end of said first aeration trough in said row, and for connecting the openings in the rearward end of each successive aeration trough with the openings in the forward end of the aeration trough just preceding it in said row, comprises: elongated resilient tubular members each having a forward portion and a rearward portion, said forward portion of said tubular members slidably secured in said openings in said rearward ends of said aeration troughs in said row, and said rearward portion of said tubular members slidably secured in said openings in said forward end of adjacent aeration troughs in said row.

3. The apparatus of claim 2 which is further characterized to include each of said elongated resilient tubular members having a first groove extending around the entire outer periphery of said forward portion of said member, and a second groove extending around the entire outer periphery of said rearward portion of said member, each of said grooves being slidably secured in one of said openings and having a continuous surface for sealingly contacting the entire inside periphery of said openings.

4. The apparatus of claim 1 wherein each of said separate airtight compartments disposed within said aeration troughs comprises:

a pair of side baffles parallel to each other and parallel to said opposite sides of said aeration trough, attached to said forward and rearward ends and bottom of said aeration trough; and a top baffle attached to said side baffles and attached to said forward and rearward ends of said aeration troughs.

5. Apparatus for mixing and unloading pulverulent material from a silo, said silo having a downwardly sloped floor and having a pulverulent material discharge valve positioned at a low point in said floor, comprising:

a plurality of aeration troughs positioned end to end in said floor forming at least one row extending transversely across said floor to said discharge valve;

each of said aeration troughs having airtight opposite sides, an airtight bottom, an air permeable top, a forward end facing said discharge valve and a rearward end facing away from said discharge valve, and having at least one opening in said rearward end, and an equal number of openings in said forward and rearward ends thereof, aligned with each other, the total number of aligned openings in the ends of the first of said aeration troughs at the end of said row opposite from said discharge valve being equal to twice the total number of aeration troughs in said row minus two, the second aeration trough and each successive aeration trough in said row having one less opening in said forward end and one less aligned opening in said rearward end thereof than the aeration trough just preceeding it in said row;

separate airtight compartments connecting each pair of aligned openings in said forward and rearward ends of said aeration troughs disposed within said aeration troughs;

means for connecting each of said openings in the rearward end of said second aeration trough to the openings in the forward end of said first aeration trough, and for connecting the openings in the rearward ends of each successive aeration trough with the openings in the forward end of the aeration trough just proceeding it in said row; and means for connecting a source of compressed air to each of said openings in the rearward end of said first aeration trough.

6. The apparatus of claim 5 wherein said means for connecting each of said openings in the rearward end of said second aeration trough in said row to the openings in the forward end of said first aeration trough in said row, and for connecting the openings in the rearward end of each successive aeration trough with the openings in the forward end of the aeration trough just preceding it in said row comprises: elongated resilient tubular members each having a forward portion and a rearward portion, said forward portion of said tubular members slidably secured in said openings in said rearward ends of said aeration troughs in said row, and said rearward portions of said tubular members slidably secured in said openings in said forward ends of adjacent aeration troughs in said row.

7. The apparatus of claim 6 which is further characterized to include each of said elongated resilient tubular members having a first groove extending around the entire outer periphery of said forward portion of said member, and a second groove extending around the entire outer periphery of said rearward portion of said member, each of said grooves being slidably secured in one of said openings and having a continuous surface for sealingly contacting the entire inside periphery of said openings.

8. The apparatus of claim 5 wherein each of said separate airtight compartments disposed within said aeration troughs comprises:

a pair of side baffles parallel to each other and parallel to said opposite sides of said aeration trough, attached to said forward and rearward ends and bottom of said aeration trough; and a top baffle attached to said side baffles and attached to said forward and rearward ends of said aeration troughs.